(12) United States Patent
Yamaguchi

(10) Patent No.: US 9,960,448 B2
(45) Date of Patent: May 1, 2018

(54) NONAQUEOUS ELECTROLYTE SECONDARY BATTERY, METHOD OF MANUFACTURING THE SAME, AND NONAQUEOUS ELECTROLYTIC SOLUTION

(71) Applicant: TOYOTA JIDOSHA KABUSHIKI KAISHA, Toyota-shi, Aichi-ken (JP)

(72) Inventor: Hiroyuki Yamaguchi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 393 days.

(21) Appl. No.: 14/797,949

(22) Filed: Jul. 13, 2015

(65) Prior Publication Data

US 2016/0020490 A1 Jan. 21, 2016

(30) Foreign Application Priority Data

Jul. 16, 2014 (JP) ................................. 2014-145807

(51) Int. Cl.

| H01M 10/0567 | (2010.01) |
|---|---|
| H01M 10/42 | (2006.01) |
| H01M 2/16 | (2006.01) |
| H01M 4/04 | (2006.01) |
| H01M 10/0525 | (2010.01) |
| H01M 4/131 | (2010.01) |
| H01M 4/1391 | (2010.01) |
| H01M 4/36 | (2006.01) |
| H01M 4/505 | (2010.01) |
| H01M 10/058 | (2010.01) |

(52) U.S. Cl.
CPC ..... *H01M 10/0567* (2013.01); *H01M 2/1673* (2013.01); *H01M 4/0447* (2013.01); *H01M 10/4235* (2013.01); *H01M 4/131* (2013.01); *H01M 4/1391* (2013.01); *H01M 4/366* (2013.01); *H01M 4/505* (2013.01); *H01M 10/058* (2013.01); *H01M 10/0525* (2013.01); *H01M 2300/0025* (2013.01)

(58) Field of Classification Search
CPC ......... H01M 10/0567; H01M 10/4235; H01M 10/0525; H01M 10/058; H01M 4/0447; H01M 4/131; H01M 4/1391; H01M 4/505; H01M 2300/0025
See application file for complete search history.

(56) References Cited

FOREIGN PATENT DOCUMENTS

| JP | 10-055819 A | 2/1998 |
|---|---|---|
| JP | 10-055820 A | 2/1998 |
| JP | 2002-042814 A | 2/2002 |
| JP | 2008-130528 A | 6/2008 |
| JP | 2013-243010 A | 12/2013 |
| WO | 2013/171991 A1 | 11/2013 |

*Primary Examiner* — Laura Weiner
(74) *Attorney, Agent, or Firm* — Sughrue Mion, PLLC

(57) ABSTRACT

A method of manufacturing a nonaqueous electrolyte secondary battery includes the following steps of: constructing a battery assembly using a positive electrode, a negative electrode, and a nonaqueous electrolytic solution containing a compound represented by a specific formula; and forming a film on a surface of the positive electrode by charging the battery assembly such that the compound is decomposed. In an embodiment, during the construction of the battery assembly, a content of the compound is adjusted to be 0.1 mass % or more with respect to 100 mass % of a total amount of the nonaqueous electrolytic solution.

6 Claims, 3 Drawing Sheets

F I G . 3
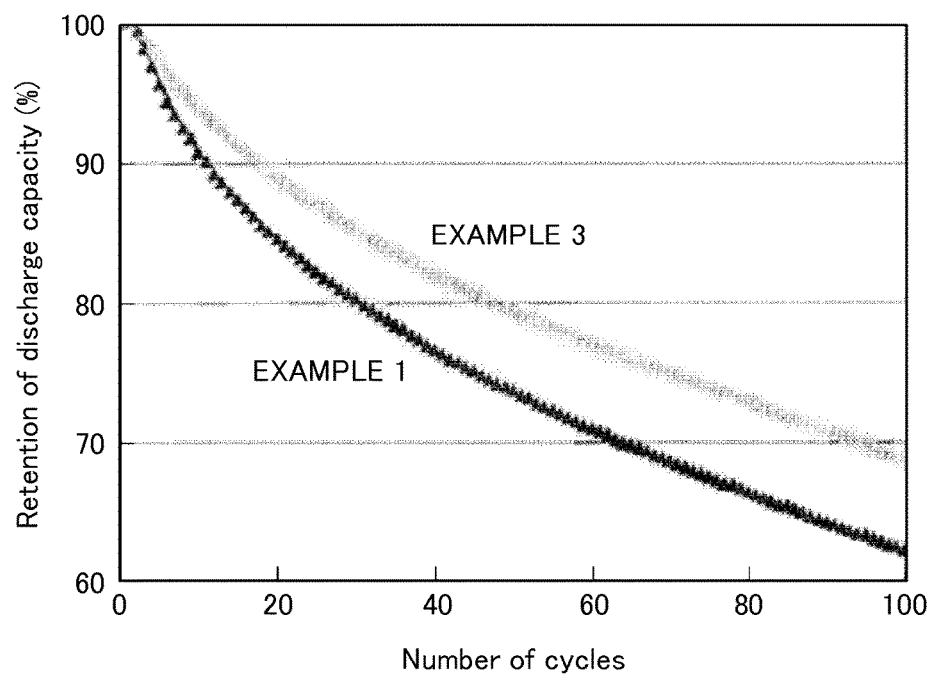

NONAQUEOUS ELECTROLYTE SECONDARY BATTERY, METHOD OF MANUFACTURING THE SAME, AND NONAQUEOUS ELECTROLYTIC SOLUTION

INCORPORATION BY REFERENCE

The disclosure of Japanese Patent Application No. 2014-145807 filed on Jul. 16, 2014 including the specification, drawings and abstract is incorporated herein by reference in its entirety.

BACKGROUND OF THE INVENTION

1. Field of the Invention

The present invention relates to a battery including a nonaqueous electrolytic solution, a method of manufacturing the battery, and a nonaqueous electrolytic solution used for the battery.

2. Description of Related Art

In a nonaqueous electrolyte secondary battery such as a lithium ion secondary battery, further improvement in energy density has been studied as an effort to improve performance. For example, Japanese Patent Application Publication No. 2002-042814 (JP 2002-042814 A) discloses that a high energy density battery can be realized by using a spinel-type lithium nickel manganese composite oxide having a high action potential as a positive electrode active material.

However, in the battery disclosed in JP 2002-042814 A, a positive electrode is in a high-potential state. Therefore, a nonaqueous electrolytic solution is oxidized and decomposed on the positive electrode, and a high-resistance film may be formed on a surface of the positive electrode. Alternatively, in the high-potential state, a constituent element (typically, a transition metal element) of a positive electrode active material may be gradually eluted in the nonaqueous electrolytic solution. In this case, the durability (for example, high-temperature cycle characteristics) of the battery may largely decrease.

SUMMARY OF THE INVENTION

The invention provides a method of manufacturing a nonaqueous electrolyte secondary battery having superior durability (for example, high-temperature cycle characteristics). The invention also provides a nonaqueous electrolyte secondary battery obtained using the above-described method; and a nonaqueous electrolytic solution for a nonaqueous electrolyte secondary battery.

The present inventors thought that an interface between a positive electrode and a nonaqueous electrolytic solution can be made to be stable by forming a film (protective film) in advance on a surface of the positive electrode in order to suppress the oxidation decomposition of the nonaqueous electrolytic solution and suppress the elution of a constituent element from a positive electrode active material. As a result of repeated investigation, the invention has been completed.

That is, according to a first aspect of the invention, there is provided a method of manufacturing a nonaqueous electrolyte secondary battery, the method including: (S10) constructing a battery assembly using a positive electrode, a negative electrode, and a nonaqueous electrolytic solution containing a cyclic compound (I) represented by the following Formula (I),

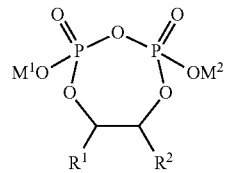

(wherein $M^1$ and $M^2$ each independently represent a hydrogen atom, an alkali metal atom, or an ammonium cation, and $R^1$ and $R^2$ each independently represent a hydrogen atom, a substituted or unsubstituted carboxyl group, or a substituted or unsubstituted alkyl group having 1 to 8 carbon atoms); and (S20) forming a film on a surface of the positive electrode by charging the battery assembly such that the compound (I) is decomposed.

By charging the battery assembly in a state where the nonaqueous electrolytic solution contains the compound (I), the compound (I) is decomposed, and thus a film containing a component derived from the compound (I) is formed on the surface of the positive electrode. Due to the film, an interface between the positive electrode and the nonaqueous electrolytic solution is stabilized. Therefore, even when the positive electrode has a high potential, the oxidation decomposition of the nonaqueous electrolytic solution and the elution of a constituent element from a positive electrode active material can be suppressed at a high level. Accordingly, according to the method disclosed herein, a battery having superior durability (for example, high-temperature cycle characteristics) can be manufactured. An example of a technique of the related art for forming a film on a positive electrode can refer to Japanese Patent Application Publication No. 2013-243010 (JP 2013-243013 A).

In an embodiment of the method disclosed herein, during the construction of the battery assembly, a content of the compound (I) is adjusted to be 0.1 mass % or more with respect to 100 mass % of the total amount of the nonaqueous electrolytic solution. As a result, the film can be more accurately and stably formed on the surface of the positive electrode.

Trilithium cyclic 2,3-diphosphoglycerate may be used as the compound (I).

In an embodiment of the method disclosed herein, the positive electrode may contain a spinel-type lithium nickel manganese composite oxide. As a result, the upper limit of the action potential of the positive electrode can be increased, and high energy density can be realized. In addition, in general, when a positive electrode active material contains a transition metal element (in particular, manganese), the transition metal element is likely to be eluted in a high-potential state. However, according to the method, the elution of a constituent element can be suppressed at a high level. Accordingly, the effects of the embodiment of the invention are exhibited.

According to a second aspect of the invention, there is provided a nonaqueous electrolyte secondary battery which is manufactured by the above-described method. In other words, there is provided a nonaqueous electrolyte secondary battery including: a positive electrode that includes a film containing a component derived from the compound (I); a negative electrode; and a nonaqueous electrolytic solution. In the nonaqueous electrolyte secondary battery, the oxidation decomposition of the nonaqueous electrolytic solution is suppressed at a high level, and the structural stability of a positive electrode active material is high. Therefore, superior durability (for example, high-temperature cycle characteristics) can be exhibited.

According to a third aspect of the invention, there is provided a nonaqueous electrolytic solution used for a nonaqueous electrolyte secondary battery. The nonaqueous electrolytic solution includes: a supporting electrolyte; a nonaqueous solvent; and the compound (I). By using this nonaqueous electrolytic solution, the above-described nonaqueous electrolyte secondary battery having high durability can be realized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a graph showing the transitions of capacity retentions in a high-temperature cycle test.

DETAILED DESCRIPTION OF EMBODIMENTS

Hereinafter, an embodiment of the invention will be described appropriately with reference to the drawings. Matters (for example, a component of a battery which is not a characteristic of the invention) necessary to practice this invention other than those (for example, the compound (I) contained in the nonaqueous electrolytic solution) specifically referred to in this description may be understood as design matters based on the related art in the pertinent field for a person of ordinary skills in the art. The invention can be practiced based on the contents disclosed in this description and common technical knowledge in the subject field.

<Method of Manufacturing Nonaqueous Electrolyte Secondary Battery>

Figure 1:
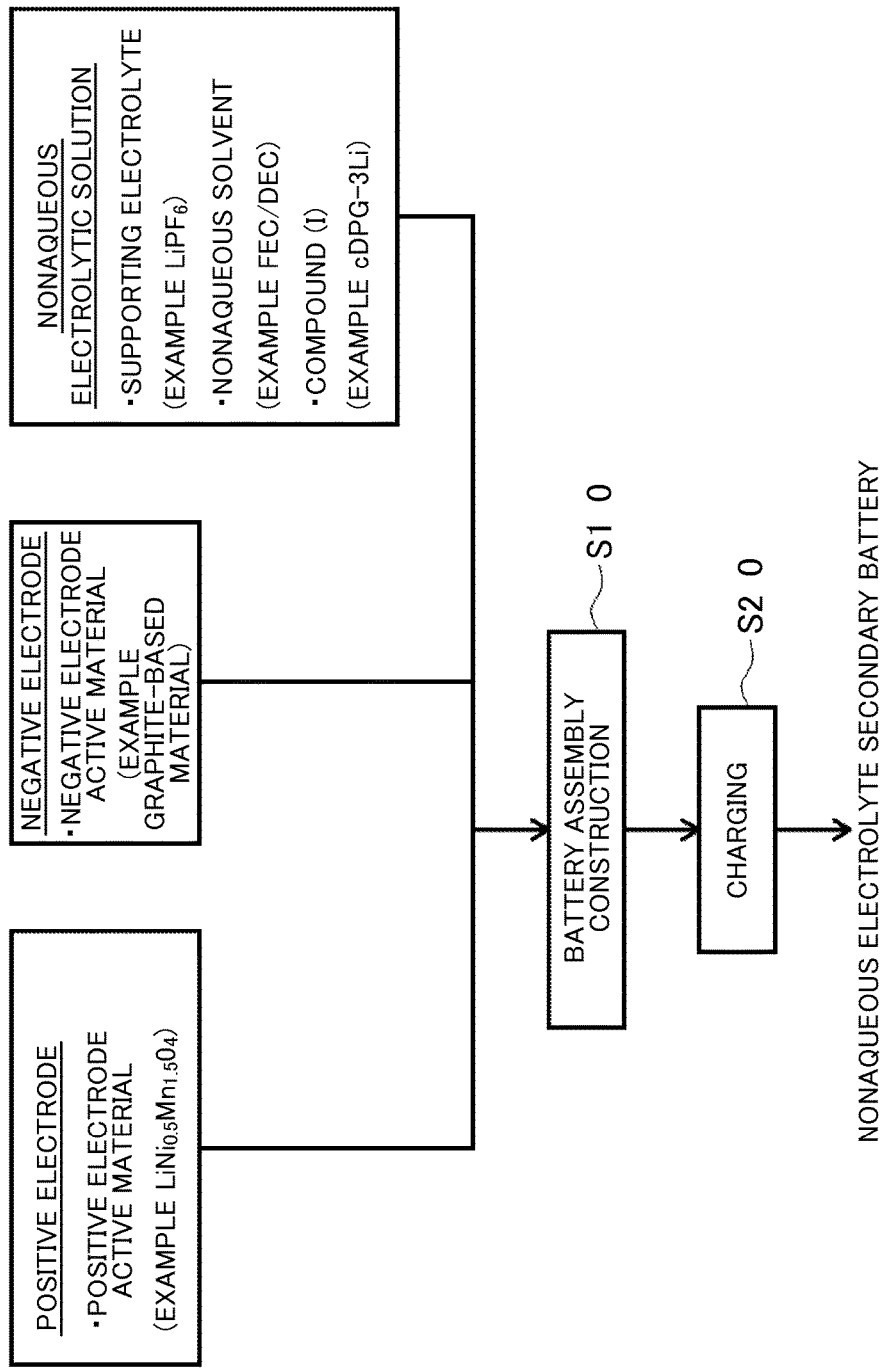
FIG. 1 is a flowchart showing a method of manufacturing a nonaqueous secondary battery according to an embodiment of the invention.

A method of manufacturing a nonaqueous electrolyte secondary battery disclosed herein includes: (S10) a battery assembly construction step; and (S20) a charging step. FIG. 1 is a flowchart showing the method according to the embodiment of the invention. Hereinafter, the respective steps will be sequentially described with reference to FIG. 1. In this specification, "ordinary temperature range" refers to 20° C.±10° C. (typically, 15° C. to 30° C., for example, 20° C. to 25° C.).

Here, first, a positive electrode, a negative electrode, and a nonaqueous electrolytic solution which are used to construct a battery assembly are prepared.

[Positive Electrode]

Typically, the positive electrode includes: a positive electrode current collector; and a positive electrode active material layer that contains a positive electrode active material attached to the positive electrode current collector. As the positive electrode current collector, a conductive member formed of highly conductive metal (for example, aluminum or nickel) can be used. As the positive electrode active material, one kind or two or more kinds can be appropriately selected among various known materials which can be used as a positive electrode active material of a nonaqueous electrolyte secondary battery. For example, a positive electrode active material having the highest action potential of 4.3 V or higher versus lithium metal (hereinafter, also referred to simply as "vs. Li/Li$^+$") can be used. In this case, it is preferable that the action potential (vs. Li/Li$^+$) of the positive electrode active material exceeds 4.3 V, for example, preferably 4.5 V or higher, more preferably 4.6 V or higher, and still more preferably 4.7 V or higher.

As a positive electrode active material capable of realizing high potential in the above-described range, a spinel-type lithium manganese composite oxide can be used. As a particularly preferable example of the positive electrode active material, a lithium nickel manganese composite oxide is used, and specific examples thereof include $LiNi_{0.5}Mn_{1.5}O_4$, $LiNi_{0.5}Mn_{1.45}Ti_{0.05}O_4$, $LiNi_{0.45}Fe_{0.05}Mn_{1.5}O_4$, $LiNi_{0.45}Fe_{0.05}Mn_{1.45}Fe_{0.05}O_4$, and $LiNi_{0.475}Fe_{0.025}Mn_{1.475}Ti_{0.025}O_4$. In the embodiment shown in FIG. 1, $LiNi_{0.5}Mn_{1.5}O_4$ is adopted. In general, when a transition metal element (for example, Ni or Mn; in particular, Mn) is contained as a component of a positive electrode active material, the transition metal element is likely to be eluted in a high-potential state. In addition, due to an acid (for example, hydrofluoric acid) produced by the decomposition of the nonaqueous electrolytic solution, the elution of the transition metal element may be accelerated. However, according to the technique disclosed herein, a film containing a component derived from the compound (I) is formed on the surface of the positive electrode, and due to the effects of the film, the elution of the transition metal element can be suppressed at a high level. Therefore, a nonaqueous electrolyte secondary battery having both high energy density and high durability can be realized.

A shape of the positive electrode active material is not particularly limited, and typically is a particle shape having an average particle size of 1 μm to 20 μm (for example, 2 μm to 10 μm). In addition, typically, the BET specific surface area of the positive electrode active material is suitably about 0.1 m$^2$/g to 5 m$^2$/g (for example, 0.2 m$^2$/g to 1 m$^2$/g). In this specification, "BET specific surface area" refers to a value obtained by analyzing a gas adsorption amount using a BET method (for example, a one-point BET method), the gas adsorption amount being measured using a gas adsorption method (constant-volume adsorption method) in which nitrogen ($N_2$) is used as an adsorbate. In this specification, "average particle size" refers to a particle size (also referred to as "$D_{50}$ particle size" or "median size") corresponding to a cumulative value of 50% in order from the smallest particle size in a volume particle size distribution which is obtained by particle size distribution measurement based on a laser diffraction laser scattering method.

The action potential of the positive electrode active material can be measured using, for example, the following method. First, a working electrode (WE) containing the positive electrode active material as a measurement object is prepared. Next, a three-electrode cell is constructed using the working electrode, lithium metal as a counter electrode (CE), lithium metal as a reference electrode (RE), and a nonaqueous electrolytic solution. Next, based on a theoretical capacity of the three-electrode cell, the SOC of the three-electrode cell is adjusted in a range of 0% to 100% at an interval of 5%. The adjustment of the SOC can be made by charging a portion between WE and CE, for example, using a general charging-discharging device or a potentiostat. The action potential of the positive electrode active material (vs. Li/Li$^+$) can be determined by measuring the potential of the portion between WE and RE of the three-electrode cell in each adjusted SOC state.

In addition to the positive electrode active material, the positive electrode active material layer may optionally contain one material or two or more materials which can be used as components of a positive electrode active material layer in a general nonaqueous electrolyte secondary battery. Examples of the material include a conductive material and a binder. As the conductive material, for example, various carbon materials such as various carbon blacks (for example, acetylene black and Ketjen black), activated carbon, graphite, and carbon fiber can be used. In addition, as the binder, for example, polyvinylidene fluoride (PVdF) or polyethylene oxide (PEO) can be used. In addition, the positive electrode active material layer may further contain various additives (for example, an inorganic compound that produces gas during overcharge, a dispersant, or a thickener) within a range where the effects of the invention do not significantly deteriorate.

[Negative Electrode]

Typically, the negative electrode includes: a negative electrode current collector; and a negative electrode active material layer that contains a negative electrode active material attached to the negative electrode current collector. As the negative electrode current collector, a conductive member formed of highly conductive metal (for example, copper or nickel) can be used. As the negative electrode active material, one kind or two or more kinds can be appropriately selected among various known materials which can be used as a negative electrode active material of a nonaqueous electrolyte secondary battery. Examples of the negative electrode active material include various carbon materials such as graphite, non-graphitizable carbon (hard carbon), graphitizable carbon (soft carbon), and a carbon material having a combination thereof; metal oxide materials such as lithium titanium composite oxide (LTO; for example, $Li_4Ti_5O_{12}$, $LiTi_2O_4$, or $Li_2Ti_3O_7$) or lithium tin composite oxide; and metal materials which are formed of a metal such as tin, silicon, or lithium or a metal alloy containing the above metal element as a major component. In the embodiment shown in FIG. 1, a graphite-based carbon material is adopted. For example, amorphous carbon-coated graphite (graphite particles whose surfaces are coated with amorphous carbon) is used. By using the amorphous carbon-coated graphite, a nonaqueous electrolyte secondary battery can be realized in which high energy density is obtained due to the graphite, and the reduction decomposition of the nonaqueous electrolytic solution on the negative electrode can be suppressed at a high level.

In addition to the negative electrode active material, the negative electrode active material layer may optionally contain one material or two or more materials which can be used as components of a negative electrode active material layer in a general nonaqueous electrolyte secondary battery. Examples of the material include a binder. As the binder, for example, styrene-butadiene rubber (SBR), polyvinylidene fluoride (PVdF), and polytetrafluoroethylene (PTFE) can be used. In addition, the negative electrode active material layer may further contain various additives (for example, a thickener, a dispersant, or a conductive material) within a range where the effects of the invention do not significantly deteriorate. For example, as the thickener, carboxymethyl cellulose (CMC) or methyl cellulose (MC) can be used.

[Nonaqueous Electrolytic Solution]

Typically, as shown in FIG. 1, the nonaqueous electrolytic solution includes: a supporting electrolyte; a nonaqueous solvent; and the compound (I). The nonaqueous electrolytic solution is liquid at the ordinary temperature range, and it is preferable that the nonaqueous electrolytic solution is typically liquid in an operating temperature range (for example, −30° C. to 60° C.) of the battery. The supporting electrolyte is not particularly limited as long as it contains charge carriers (for example, lithium ions, sodium ions, or magnesium ions; in a lithium ion secondary battery, lithium ions), and one kind or two or more kinds can be appropriately selected from among those which can be used in a general nonaqueous electrolyte secondary battery. For example, when lithium ions are used as the charge carriers, examples of the supporting electrolyte include lithium salts such as $LiPF_6$, $LiBF_4$, and $LiClO_4$. In the embodiment shown in FIG. 1, $LiPF_6$ is adopted.

The nonaqueous solvent is not particularly limited. As the nonaqueous solvent, various organic solvents which can be used in a general nonaqueous electrolyte secondary battery, for example, carbonates, ethers, esters, nitriles, sulfones, and lactones can be used. Among these, one or more fluorine-containing organic solvents having one or more fluorine atoms may be used as a constituent element, and one or more non-fluorine-containing organic solvents may be used as a constituent element. By using the fluorine-containing organic solvents, the oxidation potential of the nonaqueous electrolytic solution can be increased, and an effect of suppressing the oxidation decomposition of the nonaqueous electrolytic solution even in a high-potential state can be obtained. That is, higher oxidation resistance can be realized. However, in general, the oxidation resistance and the reduction resistance of a material are properties contradictory to each other. Therefore, when one property is improved, the other property decreases. That is, it can be said that the fluorine-containing organic solvent having high oxidation resistance is likely to be reduced and decomposed on the negative electrode. By using the fluorine-containing organic solvent in combination with the non-fluorine-containing organic solvent, not only high oxidation resistance but also high reduction resistance can be obtained.

Specific examples of the fluorine-containing organic solvent include fluorinated cyclic carbonates such as monofluoroethylene carbonate (FEC) and difluoroethylene carbonate (DFEC); and fluorinated chain carbonates such as fluoromethyl methyl carbonate, difluoromethyl methyl carbonate, trifluoromethyl methyl carbonate, and fluoromethyl difluoromethyl carbonate (TFDMC). Specific examples of the non-fluorine-containing organic solvent include carbonates of ethylene carbonate (EC), propylene carbonate (PC), diethyl carbonate (DEC), dimethyl carbonate (DMC), ethyl methyl carbonate (EMC), and the like. In the embodiment shown in FIG. 1, a mixture of monofluoroethylene carbonate and diethyl carbonate is used.

As the compound (I), an anhyride of a cyclic ethane diphosphoric acid represented by the following Formula (I) can be used.

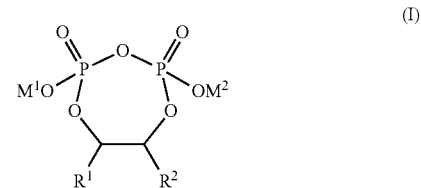

(I)

In Formula (I), $M^1$ and $M^2$ each independently represent a hydrogen atom (H); an alkali metal atom such as a lithium atom (Li), a sodium atom (Na), or a potassium atom (K); or an ammonium cation (for example, $NH_4^+$ or $NR_3H^+$). In an embodiment, $M^1$ and $M^2$ represent the same alkali metal atom (for example, a lithium atom) as a charge carrier of the supporting electrolyte. In this case, the film formed on the surface of the positive electrode may contain a charge carrier, which can decrease the resistance caused by the formation of the film. Accordingly, for example, a nonaqueous electrolyte secondary battery having superior output characteristics can be realized.

In Formula (I), $R^1$ and $R^2$ each independently represent a hydrogen atom; a carboxyl group or a salt thereof, that is, an unsubstituted carboxyl group (—C(═O)OH), or a carboxyl group in which a hydrogen atom is substituted with an alkali metal atom or the like, for example, —C(═O)OLi or —C(═O)ONa; an unsubstituted branched alkyl group having 1 to 8 carbon atoms (for example, 1 to 5 carbon atoms), for example, a methyl group, an ethyl group, an n-propyl group, an isopropyl group, an n-butyl group, a tert-butyl group, an n-pentyl group, a 1-methylbutyl group, a 2-methylbutyl group, a 3-methylbutyl group, a 1-methyl-2-methylpropyl group, a 2,2-dimethylpropyl group, an hexyl group, a heptyl group, or an octyl group; an unsubstituted cyclic alkyl group having 3 to 6 carbon atoms (typically 6 carbon atoms) such as a cyclopropyl group, a cyclobutyl group, a cyclopentyl group, or a cyclohexyl group; and a halogenated alkyl group (for example, a fluorinated alkyl group) obtained by substituting at least one hydrogen atom in the above-described unsubstituted alkyl groups with a halogen atom (for example, a fluorine atom). In an embodiment, $R^1$ and/or $R^2$ represents a hydrogen atom. In this case, an increase in resistance caused by the formation of the film can be suppressed. In another embodiment, $R^1$ and/or $R^2$ represents a substituted or unsubstituted carboxyl group. Since the carboxyl group is a polar group, the reactivity can be further improved, and a stronger film having a carboxyl group structure (for example, —C(═O)O⁻) can be formed on the surface of the positive electrode.

As the compound (I), one or two or more kinds can be appropriately selected and used from compounds obtained using a well-known method and commercially available compounds without any particular limitation. Specific examples of the compound (I) include trilithium cyclic 2,3-diphosphoglycerate, cyclic 2,3-diphosphoglycerate, myo-inositol tris pyrophosphate, and hexalithium myo-inositol tris pyrophosphate. Among these, in the embodiment shown in FIG. 1, trilithium cyclic 2,3-diphosphoglycerate (cDPG-3Li) represented by the following Formula (II) can be used.

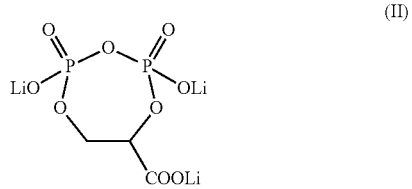

(II)

The content of the compound (I) in the nonaqueous electrolytic solution may be determined depending on, for example, the kind and properties (for example, average particle size or specific surface area) of the positive electrode active material and the usage of the battery without any particular limitation. In an embodiment, the content of the compound (I) in the nonaqueous electrolytic solution is about 0.05 mass % or more (preferably 0.1 mass % or more; for example, 0.2 mass % or more) with respect to 100 mass % of the total amount of the nonaqueous electrolytic solution from the viewpoint of forming a sufficient film on the surface of the positive electrode. By appropriately coating the surface of the positive electrode with the film, the oxidation decomposition of the nonaqueous electrolytic solution can be suppressed at a higher level. The upper limit of the content of the compound (I) is not particularly limited and, for example, may be appropriately determined in consideration of the solubility of the compound (I) in the nonaqueous solvent. In an embodiment, the upper limit of the content of the compound (I) is about 1 mass % or less (preferably 0.5 mass % or more; for example, 0.4 mass % or more) with respect to 100 mass % of the total amount of the nonaqueous electrolytic solution.

The nonaqueous electrolytic solution may further contain optional components in addition to the above-described supporting electrolyte, nonaqueous solvent, and compound (I) within a range where the effects of the invention do not significantly deteriorate. These optional components may be used for one or two or more of the purposes including: improvement of the storability of the battery; improvement of cycle characteristics; improvement of an initial charge-discharge efficiency; improvement of input and output performance; and an increase in the amount of gas produced during overcharge. Examples of the optional components include a film forming agent such as lithium bis(oxalato) borate (LiBOB) or vinylene carbonate (VC); and a gas producing agent such as cyclohexylbenzene (CHB) or biphenyl (BP).

(S10) Battery Assembly Construction Step

As shown in FIG. 1, a battery assembly is constructed typically at the ordinary temperature range using the positive electrode, the negative electrode, and the nonaqueous electrolytic solution. In an embodiment, first, an electrode body including the positive electrode and the negative electrode is prepared. The electrode body can be prepared, for example, by laminating the positive electrode and the negative electrode to be opposite each other with a separator interposed therebetween. As the separator, the same kind of a porous sheet, non-woven fabric, and the like as those used in a general nonaqueous electrolyte secondary battery can be used. Examples of the separator include a porous resin sheet formed of a resin such as polyethylene (PE), polypropylene (PP), or polyester.

Next, the electrode body and the nonaqueous electrolytic solution prepared as above are accommodated in a battery case. The battery case is formed of, for example, a light metal material such as aluminum or steel. In this specification, "battery assembly" refers to an assembly which is fabricated using the above-described electrode body and nonaqueous electrolytic solution before the charging step, and the kind, configuration, and the like of the battery are not particularly limited. For example, the battery case may be covered with a lid before or after sealing.

(S20) Charging Step

As shown in FIG. 1, the battery assembly containing the compound (I) in the nonaqueous electrolytic solution is charged. As a result, for example, the compound (I) is oxidized and decomposed on the positive electrode, and thus a film containing a component derived from the compound (I) can be formed on the surface of the positive electrode (the surface of the positive electrode active material). Alternatively, the compound (I) can be oxidized and decomposed on the negative electrode, a portion of the decomposition product moves to the positive electrode side through the nonaqueous electrolytic solution, and thus a film containing a component derived from the compound (I) can be formed on the surface of the positive electrode (the surface of the positive electrode active material). The charging (initial charging) operation is performed typically at the ordinary temperature range until the voltage between the positive and negative electrodes reaches a predetermined value after an external power supply is connected between the positive electrode (positive electrode terminal) and the negative electrode (negative electrode terminal) of the constructed battery assembly.

The voltage reached is not particularly limited because it varies depending on the kind or the like of the active material, the nonaqueous solvent, or the compound (I) to be used. Typically, the voltage reached may be determined such that the potential of the positive electrode is an oxidation decomposition potential (vs. Li/Li$^+$) of the compound (I) or higher. For example, when the compound (II) is used, the voltage reached may be determined such that the potential of the positive electrode is 4.2 V (vs. Li/LI$^+$) or higher. In addition, the upper limit of the voltage reached is typically 5.5 V or lower and preferably 5 V or lower (for example, 4.7 V to 5 V) from the viewpoint of preventing the decomposition of the nonaqueous electrolytic solution or the collapse of the positive electrode active material.

A charging method is not particularly limited. For example, a method (CC charging) of charging the battery to the voltage at a constant current, or a method (CCCV charging) of charging the battery to the voltage at a constant current and then charging the battery at a constant voltage may be used. The CC charging rate is not particularly limited. When the CC charging rate is excessively low, the processing efficiency (working efficiency) is likely to decrease. On the other hand, when the CC charging rate is excessively high, the effects of film formation may decrease due to insufficient denseness of a film to be formed. From this point of view, the charging rate may be set to be about 0.1 C to 5 C (for example, 0.5 C to 2 C). As a result, a high-quality (for example, highly dense and low-resistant) film can be formed on the surface of the positive electrode within a short period of time.

The charging may be performed once or may be performed two times or more, for example, while performing discharging therebetween. For example, a more stable film can be formed by performing one cycle of charging and discharging two to five times. Further, within a range not impairing battery characteristics, other operations may be appropriately performed to promote the decomposition of the compound (I). As the operations, for example, pressure application, ultrasonic irradiation, or retention (high-temperature aging) in a high-temperature environment of a charging state can be considered.

In this way, a nonaqueous electrolyte secondary battery can be manufactured, the battery including: a positive electrode that includes a film containing a component derived from the compound (I); a negative electrode; and a nonaqueous electrolytic solution. The film of the positive electrode may contain a phosphate ion ($PO_4^{3-}$), an M ion (for example, Li$^+$), or an R ion (for example, COO$^-$) constituting the compound (I). The case of the compound (II) will be described in more detail as an example. The film may contain a component such as $PO_4^{3-}$, $P_2O_7^{4-}$, $RPO_3^{2-}$ (R has the same definition as R$^1$ or R$^2$ of the compound (I)), $LiPO_3^{2-}$, $Li_2Po_3^-$, or COO$^-$. Due to the film, the surface of the positive electrode (the positive electrode active material, typically, a lithium transition metal composite oxide) is stabilized. Therefore, the oxidation decomposition of the nonaqueous electrolytic solution during subsequent charging and discharging can be suppressed. As a result, superior durability can be realized. According to the investigation of the present inventors, the effect of improving durability cannot be realized simply by, for example, the addition of a cyclic phosphoric monoester such as ethyl ethylene phosphate during battery construction. In this case, durability may deteriorate. In addition, for example, when an anhyride of a cyclic carboxylic acid such as succinic anhydride is added during battery construction, the effect of improving durability decreases. That is, it can be said that the compound (I) disclosed herein is more advantageous from the viewpoint of improving durability. The mechanism is not clear but is presumed to be that a relatively unstable 7-membered ring structure or a diphosphoric acid (a pyrophosphoric acid; $P_2O_7^{4-}$) structure of the compound (I) plays an important role of improving durability.

The use of the compound (I) during the construction of the nonaqueous electrolyte secondary battery can be checked using the following methods: (A) a method in which a hole is formed on the top surface of the battery in an inert atmosphere, the nonaqueous electrolytic solution is collected through the hole, and the nonaqueous electrolytic solution is analyzed using means such as a gas chromatography-mass spectrometer (GC-MS), a liquid chromatography-mass spectrometer (LC-MS), or ion chromatography (IC), to qualitatively and quantitatively analyze the compound (I) and chemical species (for example, $PO_4^{3-}$, $MPO_3^{2-}$, or $P_2O_7^{4-}$) derived from a decomposition product of the compound (I); and (B) a method in which the battery is disassembled in an inert atmosphere to separate the positive electrode therefrom, a film component on the surface of the positive electrode is extracted using an appropriate organic solvent, and this extract is analyzed using means such as GC-MS, LC-MS, or IC to qualitatively and quantitatively analyze the compound (I) and chemical species derived from a decomposition product of the compound (I).

<One Embodiment of Nonaqueous Electrolyte Secondary Battery>

Although it is not intended to limit the invention, a nonaqueous electrolyte secondary battery according to an embodiment of the invention in which a flat wound electrode body and a nonaqueous electrolytic solution are accommodated in a flat rectangular battery case will be described as an example. In the following drawings, parts or portions having the same function are represented by the same reference numerals, and the repeated description will not be made or will be simplified. In each drawing, a dimensional relationship (for example, length, width, or thickness) does not necessarily reflect the actual dimensional relationship.

Figure 2:
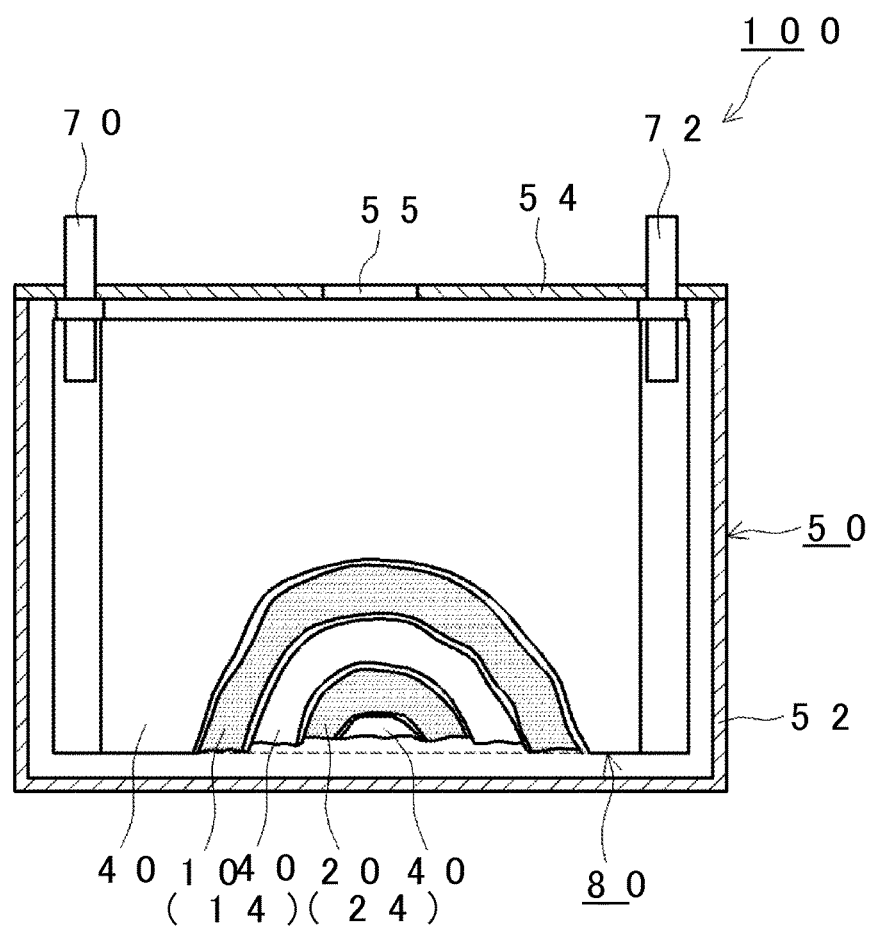
FIG. 2 is a cross-sectional view schematically showing a configuration of the nonaqueous electrolyte secondary battery according to the embodiment of the invention.

FIG. 2 is a vertical cross-sectional view schematically showing a cross-sectional structure of a nonaqueous electrolyte secondary battery 100. In this nonaqueous electrolyte secondary battery 100, an electrode body (wound electrode body) 80 and a nonaqueous electrolytic solution are accommodated in a flat box-shaped battery case 50, the electrode body 80 having a configuration in which an elongated positive electrode sheet 10 and an elongated negative electrode sheet 20 are wounded flat with an elongated separator sheet 40 interposed therebetween.

The battery case 50 includes: a flat rectangular (box shape) battery case body 52 having an open upper end; and a lid 54 that covers the opening. In a top surface (that is, the lid 54) of the battery case 50, a positive electrode terminal 70 for external connection, which is electrically connected to the positive electrode of the wound electrode body 80, and a negative electrode terminal 72, which is electrically connected to the negative electrode of the wound electrode body 80, are provided. As in the case of a battery case of a nonaqueous electrolyte secondary battery in the related art, the lid 54 further includes a safety valve 55 for discharging gas, produced from the inside of the battery case 50, to the outside of the battery case 50.

In the battery case 50, the flat wound electrode body 80 and the nonaqueous electrolytic solution (not shown) are accommodated. This wound electrode body 80 has an elongated sheet structure in a step before assembly. The positive electrode sheet 10 includes a long positive electrode current collector; and a positive electrode active material layer 14 that is formed on at least one surface (typically, on both surfaces) in a longitudinal direction. The negative electrode sheet 20 includes a long negative electrode current collector; and a negative electrode active material layer 24 that is formed on at least one surface (typically, on both surfaces) in a longitudinal direction. In addition, two separators (separator sheets) 40 having an elongated sheet shape are arranged between the positive electrode active material layer 14 and the negative electrode active material layer 24 as an insulating layer for preventing direct contact therebetween.

A winding core portion is formed in the center of the wound electrode body 80 in a width direction which is defined as a direction moving from one end portion to another end portion in the winding axial direction, the winding core portion having a configuration in which the positive electrode active material layer 14, which is formed on the surface of the positive electrode current collector, and the negative electrode active material layer 24, which is formed on the surface of the negative electrode current collector, overlap each other to be densely laminated. In addition, at opposite end portions of the wound electrode body 80 in the winding axial direction, a positive electrode active material layer non-forming portion of the positive electrode sheet 10 and a negative electrode active material layer non-forming portion of the negative electrode sheet 20 protrude from the winding core portion to the outside, respectively. A positive electrode current collector plate 74 is attached to the protrusion on the positive electrode side (the positive electrode active material layer non-forming portion). A negative electrode current collector plate 76 is attached to the protrusion on the negative electrode side (the negative electrode active material layer non-forming portion). Both the positive and negative electrode current collector plates are electrically connected to the positive electrode terminal 70 and the negative electrode terminal 72 described above, respectively.

<Use of Nonaqueous Electrolyte Secondary Battery>

The nonaqueous electrolyte secondary battery (typically, a lithium ion secondary battery) which is manufactured using the method disclosed herein can be used for various applications and can have superior high-temperature cycle characteristics, for example, high energy density. Accordingly, due to the superior characteristics, the nonaqueous electrolyte secondary battery can be used in an application where a usage environment is at a high temperature of 50° C. or higher, for example, as a power source (driving power supply) for a vehicle-mounted motor. The type of the vehicle is not particularly limited, but typical examples thereof include vehicles such as a plug-in hybrid vehicle (PHV), a hybrid vehicle (HV), and an electric vehicle (EV). Accordingly, according to another aspect of the invention, there is provided a vehicle including any one of the nonaqueous electrolyte secondary batteries (which may be in the form of a battery pack) disclosed herein.

Hereinafter, several examples relating to the invention will be described, but the specific examples are not intended to limit the invention.

First, 0.8 g of acetylene black (AB, "DENKA BLACK HS-100" (trade name, manufactured by Denki Kagaku Kogyo K.K.) as a conductive material was added to 6.0 g of polyvinylidene fluoride (PVdF, "KF POLYMER #7305" (trade name, manufactured by Kureha Corporation), N-methylpyrrolidone (NMP) solution having a solid content of 5 mass %) as a binder, and the components were mixed with each other for 5 minutes. Next, 8.9 g of $LiNi_{0.5}Mn_{1.5}O_4$ (Ni—Mn spinel) as a positive electrode active material was added, and the components were mixed with each other for 10 minutes. The coating properties (viscosity) of the mixture were adjusted with NMP. As a result, a slurry composition having a mass ratio (Ni—Mn spinel:PVdF:AB) of 89:8:3 was prepared. An aluminum foil (positive electrode current collector) having a thickness of 15 μm was manually coated with the obtained composition using a doctor blade to form a positive electrode active material layer on the aluminum foil. The obtained positive electrode was dried and roll-pressed, and thus a positive electrode (positive electrode sheet) was prepared.

Next, 3.0 g of NMP was added to 6.2 g of polyvinylidene fluoride (PVdF, "KF POLYMER #1120" (trade name, manufactured by Kureha Corporation), NMP solution having a solid content of 12 mass %) as a binder, and the components were mixed with each other for 5 minutes. Next, 9.3 g of amorphous carbon-coated natural graphite as a negative electrode active material was added, and the components were mixed with each other for 10 minutes. The coating properties (viscosity) of the mixture were adjusted with NMP. As a result, a slurry composition having a mass ratio (natural graphite:PVdF) of 92.5:7.5 was prepared. A copper foil (negative electrode current collector) having a thickness of 10 μm was manually coated with the obtained composition using a doctor blade to form a negative electrode active material layer on the copper foil. The obtained negative electrode was dried and roll-pressed, and thus a negative electrode (negative electrode sheet) was prepared.

Next, the following five kinds of nonaqueous electrolytic solutions were prepared.

(Nonaqueous Electrolytic Solution A)

$LiPF_6$ was dissolved in a mixed solvent such that the concentration thereof was 1 mol/L, the mixed solvent containing monofluoroethylene carbonate (FEC) as a fluorinated cyclic carbonate and diethyl carbonate (DEC) as a chain carbonate at a volume ratio of 3:7. As a result, a nonaqueous electrolytic solution A was prepared.

(Nonaqueous Electrolytic Solution B)

Trilithium cyclic 2,3-diphosphoglycerate (cDPG-3Li) represented by Formula (II) was added to and dissolved in the nonaqueous electrolytic solution A such that a ratio of the amount thereof to the total amount of the nonaqueous electrolytic solution was 0.1 mass %. As a result, a nonaqueous electrolytic solution B was prepared.

(Nonaqueous Electrolytic Solution C)

Trilithium cyclic 2,3-diphosphoglycerate (cDPG-3Li) represented by Formula (II) was added to the nonaqueous electrolytic solution A such that a ratio of the amount thereof to the total amount of the nonaqueous electrolytic solution was 0.5 mass %. A portion of the added compound (II) was precipitated without being dissolved in the nonaqueous electrolytic solution. As a result, the supernatant liquid was obtained as a nonaqueous electrolytic solution C.

(Nonaqueous Electrolytic Solution D)

Ethyl ethylene phosphate (EEP) represented by the following Formula (III) was added to and dissolved in the nonaqueous electrolytic solution A such that a ratio of the amount thereof to the total amount of the nonaqueous electrolytic solution was 0.5 mass %. As a result, a nonaqueous electrolytic solution D was prepared.

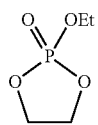

(III)

(Nonaqueous Electrolytic Solution E)

Succinic anhydride was added to and dissolved in the nonaqueous electrolytic solution A such that a ratio of the amount thereof to the total amount of the nonaqueous electrolytic solution was 0.5 mass %. As a result, a nonaqueous electrolytic solution E was prepared.

[Construction of Battery Assembly]

Next, the positive electrode sheet and the negative electrode sheet prepared as above were cut into predetermined sizes and were accommodated in a coin type cell in a state where being disposed opposite each other with a separator interposed therebetween, and the nonaqueous electrolytic solution shown in Table 1 was injected thereinto. Next, as the separator, a separator having a three-layer structure in which a polypropylene (PP) layer was laminated on both surfaces of a polyethylene (PE) layer was used.

In this way, battery assemblies of Examples 1 to 5 were constructed.

TABLE 1

| | Nonaqueous Electrolytic Solution | | | High Temperature Characteristics |
| --- | --- | --- | --- | --- |
| | Kind | Additive | Addition Amount | Capacity Retention (%) |
| Example 1 | A | — | — | 62 |
| Example 2 | B | cDPG-3Li | 0.1 wt % | 67 |
| Example 3 | C | cDPG-3Li | 0.5 wt %* | 69 |
| Example 4 | D | Ethyl Ethylene Phosphate | 0.5 wt % | 60 |
| Example 5 | E | Succinic Anhydride | 0.5 wt % | 65 |

*Due to incomplete dissolution, the supernatant liquid was used

[Charging]

Each of the constructed battery assemblies underwent three cycles of the following charging-discharging operations in a temperature environment of 25° C. and was charged at a low rate. The discharge capacity of the first cycle was obtained to determine whether or not there was a defect.

Charging: The battery assembly was charged at a constant current (CC) of 0.3 C until the voltage between the positive and negative electrode terminals reached 4.9 V.

Discharging: The battery assembly was discharged at a constant current (CC) of 0.3 C until the voltage between the positive and negative electrode terminals reached 3.5 V.

[Evaluation of High-Temperature Cycle Characteristics]

The obtained nonaqueous electrolyte secondary battery was left to stand in a thermostatic chamber with a set temperature of 60° C. for 2 hours or longer and underwent 100 cycles of the following charging-discharging operations (1) and (2). (1) The battery was charged at a constant current (CC) of 2 C until the voltage between the positive and negative electrode terminals reached 4.9 V, and was charged at a constant voltage (CV) until the current reached 0.15 C. (2) The battery was discharged at a constant current (CC) of 2 C until the voltage between the positive and negative electrode terminals reached 3.5 V. Next, the capacity retention (%) was calculated from a ratio of the discharge capacity of the N-th cycle to the discharge capacity of the first cycle ((Discharge Capacity of N-th Cycle/Discharge Capacity of First Cycle)×100(%)). FIG. 3 shows the transitions of capacity retentions of Examples 1 and 3 as representative examples. In addition, Table 1 shows the capacity retention (%) after 100 cycles (high-temperature cycles).

As shown in Table 1, as compared to Example 1 in which no additive was used, in Example 4 where the compound (III) was added, the capacity retention after the high-temperature cycles was lower. In Example 5 in which succinic anhydride was added, the capacity retention after the high-temperature cycles was improved. In Examples 2 and 3 where the compound (II) was added, as shown in FIG. 3 and Table 1, the capacity retention after the high-temperature cycles was significantly improved as compared to the above examples. In this way, in the nonaqueous electrolyte secondary battery manufactured using the method disclosed herein, high durability (high-temperature cycle characteristics) is exhibited. The above results show the technical significance of the invention.

Hereinabove, specific examples of the invention have been described in detail. However, these examples are merely exemplary and do not limit the claims. The technique described in the claims includes various modifications and alternations of the above-described specific examples.

What is claimed is:

1. A method of manufacturing a nonaqueous electrolyte secondary battery, the method comprising:

constructing a battery assembly using a positive electrode, a negative electrode, and a nonaqueous electrolytic solution containing a compound (I) represented by following Formula (I),

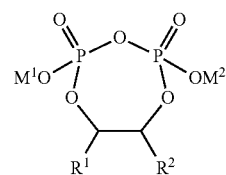

(I)

wherein $M^1$ and $M^2$ each independently represent a hydrogen atom, an alkali metal atom, or an ammonium cation, and $R^1$ and $R^2$ each independently represent a hydrogen atom, a substituted or unsubstituted carboxyl group, or a substituted or unsubstituted alkyl group having 1 to 8 carbon atoms; and forming a film on a surface of the positive electrode by charging the battery assembly such that the compound (I) is decomposed.

2. The method of manufacturing the nonaqueous electrolyte secondary battery according to claim 1, wherein during the construction of the battery assembly, a content of the compound (I) is adjusted to be 0.1 mass % or more with respect to 100 mass % of a total amount of the nonaqueous electrolytic solution.

3. The method of manufacturing the nonaqueous electrolyte secondary battery according to claim 1, wherein
trilithium cyclic 2,3-diphosphoglycerate is used as the compound (I).

4. The method of manufacturing the nonaqueous electrolyte secondary battery according to claim 1, wherein
the positive electrode contains a spinel-type lithium nickel manganese composite oxide.

5. A nonaqueous electrolyte secondary battery comprising:
a battery assembly that is constructed using a positive electrode, a negative electrode, and a nonaqueous electrolytic solution, wherein
the nonaqueous electrolyte secondary battery is manufactured using the method according to claim 1.

6. A nonaqueous electrolytic solution used for a nonaqueous electrolyte secondary battery, the nonaqueous electrolytic solution comprising:
a supporting electrolyte;
a nonaqueous solvent; and
a compound (I) represented by following Formula (I),

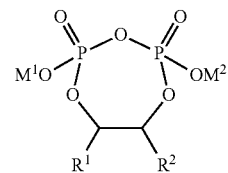

wherein $M^1$ and $M^2$ each independently represent a hydrogen atom, an alkali metal atom, or an ammonium cation, and $R^1$ and $R^2$ each independently represent a hydrogen atom, a substituted or unsubstituted carboxyl group, or a substituted or unsubstituted alkyl group having 1 to 8 carbon atoms.

* * * * *